United States Patent [19]
Bailleul et al.

[11] Patent Number: 5,892,365
[45] Date of Patent: Apr. 6, 1999

[54] CAPACITIVE SENSOR DEVICE FOR USE AT HIGH TEMPERATURE AND PRESSURE, INCLUDING A COAXIAL CABLE WITH INTEGRATED END PORTION

[75] Inventors: Gilles Bailleul, Conde-Sur-Noireau; Samim Albijat, Flers, both of France

[73] Assignee: Thermocoax SAS, France

[21] Appl. No.: 882,867

[22] Filed: Jun. 26, 1997

[30] Foreign Application Priority Data

Jun. 26, 1996 [FR] France ..................................... 9607943

[51] Int. Cl.⁶ ................................................... G01R 27/26
[52] U.S. Cl. ........................... 324/690; 324/662; 324/671
[58] Field of Search .................... 324/661, 662, 324/663, 671, 686, 688, 690

[56] References Cited

U.S. PATENT DOCUMENTS

| | | | |
|---|---|---|---|
| 4,063,167 | 12/1977 | Duly | 324/671 |
| 4,329,644 | 5/1982 | Libertini et al. | 324/662 |
| 4,804,905 | 2/1989 | Ding et al. | 324/662 |
| 4,818,949 | 4/1989 | Dooley | 324/662 |
| 5,101,165 | 3/1992 | Rickards | 324/662 |
| 5,166,626 | 11/1992 | Hester et al. | 324/690 |

FOREIGN PATENT DOCUMENTS

| | | | |
|---|---|---|---|
| 0246576A1 | 11/1987 | European Pat. Off. | G01B 7/14 |
| 0544367A1 | 6/1993 | European Pat. Off. | G01B 7/14 |
| 2071852 | 9/1981 | United Kingdom | G01B 7/14 |

*Primary Examiner*—Diep N. Do
*Attorney, Agent, or Firm*—Armstrong, Teasdale, Schlafly & Davis

[57] ABSTRACT

A capacitive sensor device for use at least up to 1300° C. and 40 bar, including a coaxial cable comprising a conductive sleeve (10) and at least one inner conductor (21) which are separated by an insulator (19), said cable having an end portion (1) of enlarged diameter forming a probe in which the insulator is an anticorrosive refractory element (9, 29) locked by a first and a second anticorrosive refractory metal protection element (5, 4), welded to the sleeve and to said inner conductor, respectively, which second protection element forms an electrode (4) having a flat surface (4a) of an area larger than the cross-sectional area of the end portion of the inner conductor.

10 Claims, 2 Drawing Sheets

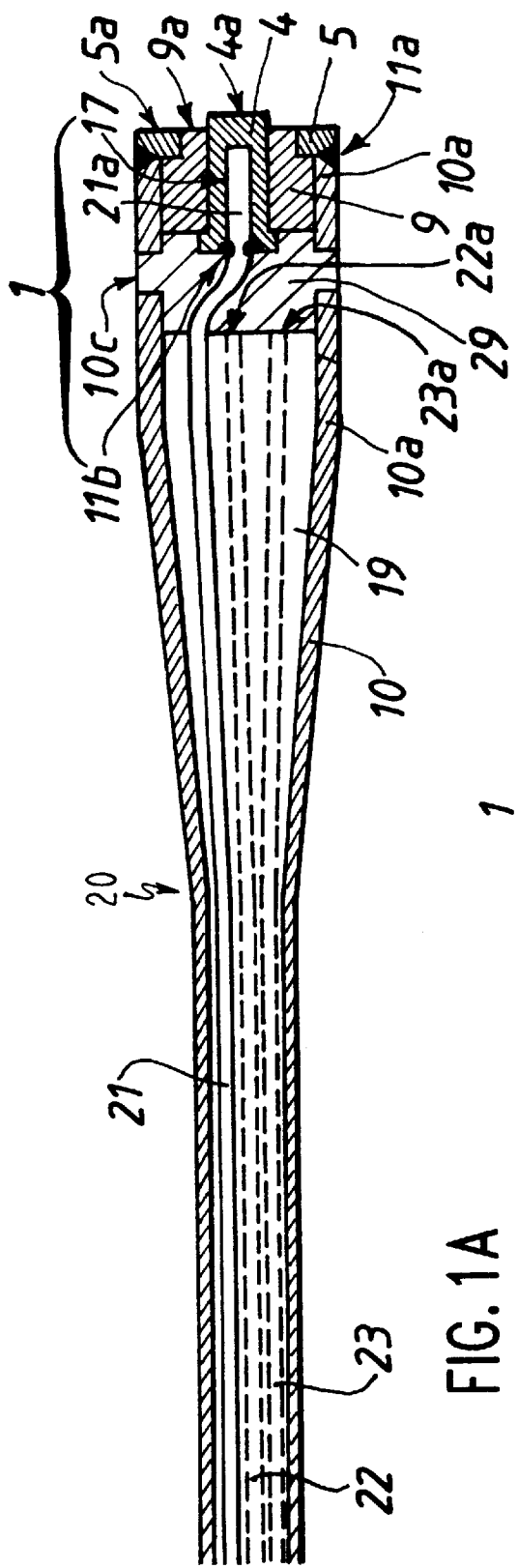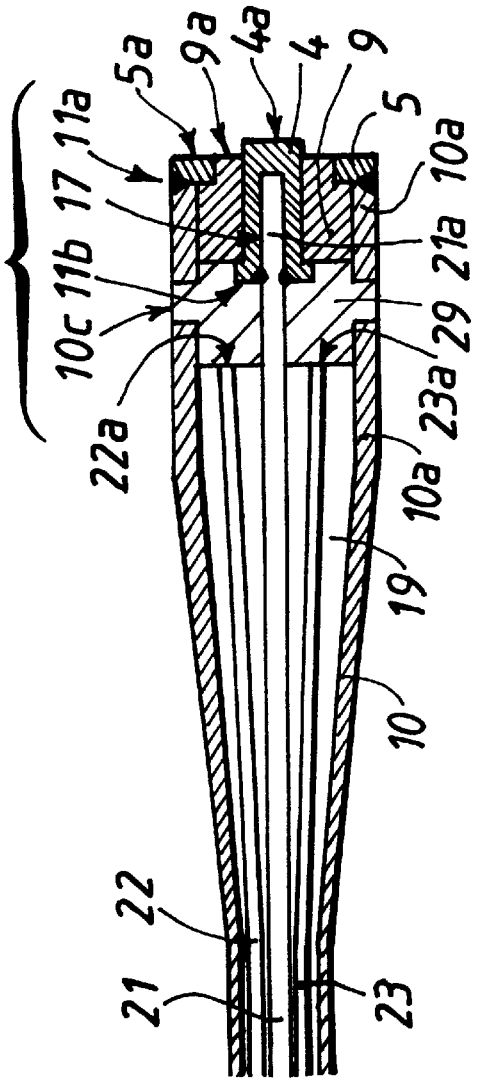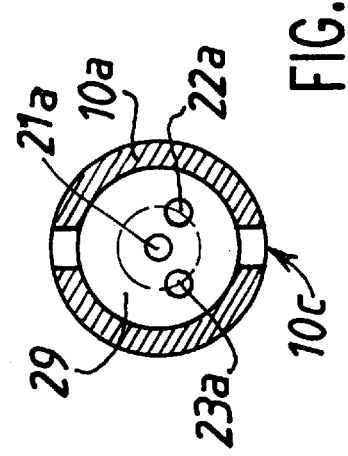

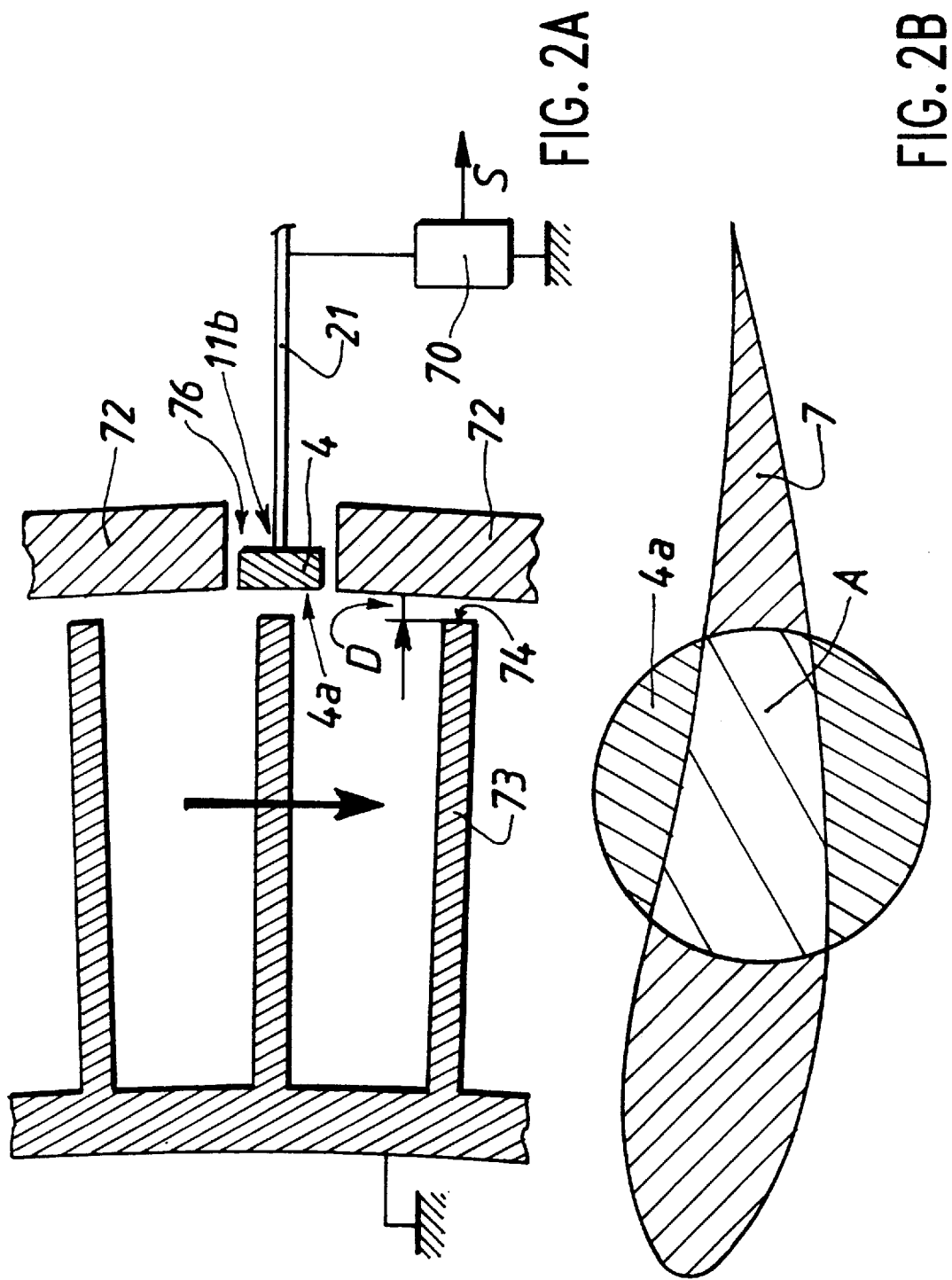

CAPACITIVE SENSOR DEVICE FOR USE AT HIGH TEMPERATURE AND PRESSURE, INCLUDING A COAXIAL CABLE WITH INTEGRATED END PORTION

The invention relates to a capacitive sensor device including an integrated probe having an electrode with a flat surface and including a coaxial cable for connecting said probe to measurement means.

The invention is applied particularly in the aircraft industry for the dynamic control of operating parameters of turbo engines by measuring of the capacitance of a capacitor formed by the conductive surface of the probe and the rotor blade tips.

A capacitive sensor is already known from the Patent EP 0544367. This known sensor comprises a probe body and a coaxial cable. A coaxial cable is to be understood to mean a cable having a metal sleeve and a central conductor insulated from the sleeve by a compacted mineral insulant. In the known sensor the probe is formed directly by an end portion of the coaxial cable of which both the sleeve and the central conductor have a larger diameter than the rest of the coaxial cable. The electrode of the probe is formed by the bare end of the central conductor in said end portion. This end forms a flat conductive surface constituting one electrode of a capacitor. This conductive surface is disposed opposite to rotor blade tips in a combustion chamber of a turbo engine. The rotor blade tips, as they move past the conductive surface, form the second electrode of the capacitor. The central conductor of the coaxial cable connects the conductive surface to devices for measuring the capacitance of this capacitor.

A technical problem of this known sensor is that it can only have a probe with conductive surface of small area. As a matter of fact, this sensor is drawn from a preform of a given diameter whose end portion is drawn out to a smaller extent in order to obtain the probe of larger diameter than the cable. Nevertheless, the diameter of the probe and, consequently, the conductive surface are limited by the diameter of the preform, which cannot be modified substantially.

It is an object of the invention to provide a capacitive sensor device whose probe has a conductive surface of larger diameter. As a matter of fact, the signal obtained for the capacitance measurement is proportional to the area of the conductive surface. Therefore, it is advantageous to have a conductive surface whose area is as a large as possible within the limits of the envisaged use.

Another technical problem of the known sensor is that it can operate only up to the temperature of a compression chamber, i.e. between 500° and 700° C., the pressure not being specified.

It is another object of the invention to provide such a device whose probe is suitable for carrying out measurements in a combustion chamber of a turbo machine, i.e. not only at 700° but also at a much higher temperature of the order of 1300° C. and at a pressure is of approximately 40 bar.

These problems are solved and these objects are achieved by means of a capacitive sensor device for use at least up to 1300° C. and 40 bar, including a coaxial cable comprising a conductive sleeve and at least one inner conductor which are separated by an insulator, said cable having an end portion of enlarged diameter forming a probe in which the insulator is an anticorrosive refractory element locked by a first and a second anticorrosive refractory metal protection element, welded to the sleeve and to said inner conductor, respectively, which second protection element forms an electrode having a flat surface of an area larger than the cross-sectional area of the end portion of the inner conductor.

In this new embodiment this device can transmit larger signals because the area of the flat electrode surface has increased as a result of the fact that the available area is no longer that of the inner conductor but that of the added protection element; this device is mechanically stronger up to very high temperatures of the order of 1300° C. and up to pressures of the order of 40 bar because the standard elements of the cable in the end portion are replaced by elements of materials exactly fit for this temperature, assembled in such a manner that they can withstand such pressures. In particular, the end portion of the cable comprises a very small number of elements assembled in a very compact manner with only two mechanically very strong metal-to-metal welds.

Another problem resides in the fact that when the sensor is used for dynamic capacitance measurement the characteristics of the coaxial transmission cable can drift.

It is an object of the invention to eliminate this problem of drift of the characteristics of the coaxial transmission cable under dynamic conditions.

This problem is solved and this object is achieved by a device as described above in which the coaxial cable comprises a first inner conductor, referred to as the central conductor, connected to said electrode and disposed centrally in the sleeve, and two further inner conductors whose ends at the probe side are cut in such a manner that they terminate in said filler material, and whose other ends are arranged as a capacitance bridge with the central conductor and ground.

In this new embodiment drift of the characteristics is compensated for in the sensor itself by means of the coaxial cable having three conductors. This differs from the use of a cable with a guard ring. The guard ring known from the state of the art is intended for the compensation of parasitic capacitances. The guard ring is particularly useful for static measurements. The guard ring makes the sensor difficult to manufacture and bulky and the guard ring is not very useful for dynamic measurements.

In general, this sensor, referred to hereinafter as an integrated sensor is compact and exhibits a high performance. It is very easy to install. It is highly resistant to thermal shocks, it is corrosion proof, and it is insensitive to the vibrations in combustion chambers of aircraft engines.

Moreover, it can be manufactured simply and, as consequence, cheaply.

The diagrammatic Figures, which show a device in accordance with the invention, are described briefly hereinafter:

FIG. 1A is a longitudinal sectional view showing an example of an embodiment of a capacitive sensor; FIG. 1B shows a projection of this sensor in an axial plane; and FIG. 1C shows this sensor in cross-sectional view;

FIG. 2A shows diagrammatically a capacitive sensor mounted on the casing of a turbo engine, and FIG. 2B shows a projection of the electrode surface involved in determining the variable capacitance.

Hereinafter, embodiments of a capacitive sensor device will be described in more detail by way of non-limitative examples.

The device described hereinafter is a capacitive sensor capable of operating at temperatures as high as 1300° C. and pressures of the order of 40 bar with improved detection of a signal which is a function of a measured capacitance.

FIG. 1 is a longitudinal sectional view of a capacitive sensor, which device comprises a probe 1 including an electrode 4 having a flat conductive surface 4a forming one electrode of a capacitor. This device also comprises a coaxial cable 20 for connecting the probe 1 to capacitance measurement means.

The coaxial cable 20 comprises a central conductor 21 metal sleeve 10 and a tubular metal sleeve 10, which is insulated from the central conductor 21 by a compacted mineral powder insulator 19.

In a first embodiment the coaxial cable comprises a single inner conductor 21, which is the central conductor used for the capacitance measurement.

In a second embodiment the coaxial cable comprises a plurality of inner conductors, for example three, 21, 22, 23. In the case of a cable having three inner conductors a first inner conductor 21 is used as the central conductor for the capacitance measurement and the two other inner conductors 22, 23 are used to form a capacitive bridge with the central conductor and ground.

In the first embodiment and the second embodiment the probe 1 is formed in an end portion of increased diameter of the coaxial cable 20 in accordance with an integrated structure. In this end portion of increased diameter the sleeve of the cable and the central conductor(s) have diameters increased to the same proportion.

This result is obtained by using the method already described in the prior art constituted by the Patent Specification EP 0544367. In accordance with said method the production of the coaxial cable involves the formation of a preform comprising a cylindrical metal sleeve and one or a plurality of inner conductors separated from the sleeve and, if applicable, from one another, by a mineral powder insulator. The preform has a diameter equal to approximately 10 times the diameter of the finished coaxial cable. The preform is turned into the finished cable by successive mechanical drawing and swaging operations with intermediate high-temperature annealing. Thus, the finished coaxial cable exhibits a certain flexibility.

In order to manufacture the capacitive sensor in accordance with the invention a preform of uniform diameter is made for the cable 20 and the probe 1. Subsequently, the preform is subjected to a known mechanical process in which the diameter of the preform is reduced to a smaller extent in the zone corresponding to the probe 1 than in that corresponding to the coaxial cable 20. This is achieved during successive mechanical and thermal operations.

After a cable has been obtained which has the respective diameters suitable for the formation of the probe portion 1 at one end and the coaxial cable 20 as the extension of the probe, the probe 1 is manufactured in such a manner that it is integrated in the sleeve of the cable. For this purpose, the mineral insulator is removed from the central conductor or from the one of the inner conductors used as the central conductor at the cable end portion of increased diameter. If there are several inner conductors the non-central conductors are cut to be flush with the level where the mineral insulator has been removed, in such a manner that the end faces 22a, 23a of the respective inner conductors 22, 23 are exposed.

The probe comprises a substantially cylindrical refractory anticorrosive metal electrode 4. One base of the cylinder forms the flat conductive surface 4a intended to form said capacitor electrode. Said flat electrode surface has an area larger than the cross-sectional area of the central conductor. The cylinder has an axial recess up to the other base. This recess 17 receives the bare end 21a of the central conductor. The cylindrical electrode 4 is disposed in the part of the probe 1 from which the mineral insulator has been removed and is axially positioned in the end portion of the metal sleeve 10a. In the case that the central conductor is one of a plurality of inner conductors, its end 21a is axially positioned so as to avoid contact with the other conductors whose end faces should be remain exposed.

The electrode 4 is locked in its axial position by means of a ring 9 of an anticorrosive refractory ceramic insulating material whose outer surface 9a slightly recedes relative to the conductive surface 4a. The refractory ring 9 is held in place by an anticorrosive refractory metal ring 5 having an outer surface 5a, which has been fitted onto the end 10a of the sleeve 10 and which engages with a shoulder of the insulating ring 9.

The end of the metal sleeve 10a has apertures 10c through which a laser weld 11b can be formed between the end 21a of the central conductor and the edge of the recess 17 of the electrode 4 once the end 21a of the central conductor and the electrode 4 have been placed into the probe. This precludes corrosion of the electrode 4. Subsequently, an anticorrosive refractory insulating filler material 29 is injected through the same apertures 10c.

This system allows the probe to be used at 40 bar: it has only two welds formed at the metal parts to keep the parts forming the probe 1 together. The first weld 11b secures the end 21a of the central conductor 21 in the recess 17 of the electrode 4. The second weld 11a secures the metal ring 5 to the end 10a of the sleeve. The welds are laser welds and are refractory and anticorrosive.

FIG. 1B shows the longitudinal sectional view of FIG. 1A in the case that the cable comprises three inner conductors, projected in the same axial plane for a better understanding of the structure of the sensor formed by the cable 10, 19, 21, 22, 23 and the probe 1 with its elements 10a, 9, 29, 5, 21a, 17, 4 and 4a.

FIG. 1C is a cross-sectional view showing the probe 1, the sleeve end 10a, the apertures 10c, the central conductor 21a disposed on the axis of the probe 1, the projections 22a and 23a of the ends of the non-central inner conductors, and the insulating filler material 29.

The technical specifications of the materials required for operation of the probe at 1300° C. are given below by way of example:

the sleeve 10 and the conductors 21, 22, 23 of the coaxial cable are made of INCONEL;

the mineral insulator 19 is of magnesium oxide;

the electrode 4 and the ring 5 are made of conductive refractory materials such as platinum (Pt) or of MA956, which is a refractory conductive alloy available from HAYNES (1020 West Park Avenue, PO Box 9013, Kokomo, Ind. 46904, U.S.A.);

the ring 9 is made of aluminum or beryllium oxide.

The filler material 29 is a non-organic refractory binder or cement on a ceramic basis. For this filler material a product can be used which is commercially available under the reference FC4 from Messrs. ARES, 8 rue Gustave EIFFEL, 77506 CHELLES, France.

The laser welds also form important elements of this sensor.

The probe thus integrated in the end of the sleeve of the coaxial cable is highly resistant to temperature, to thermal shocks because the electrode 4 and the locking ring 5 from protection elements for the central inner conductor and the end of the sleeve; moreover, the probe is also highly resistant to pressure because its small number of elements are very firmly secured by means of only two metal-to-metal laser welds. In conjunction with the insulator formed by the ring 9 and the filler material 19, this probe forms a hermetic assembly which is insensitive to corrosive agents and to vibrations. It can easily be mounted in an opening of small diameter formed in the wall of a casing of a combustion chamber, the conductive surface 4a being aligned with the inner wall of the casing. Moreover, this probe has an electrode area larger than the cross-sectional area of the central conductor and thus yields improved measurements as compared with the cited prior art.

When used for determining the variable capacitance between the rotor blades and the casing of a turbo engine, reference being made to FIG. 2A, the flat conductive surface 4a of the electrode 4 is disposed at right angles to a row of blades 73 by means of a hole 76 formed in the wall 72 of the casing of the combustion chamber. Moreover, the conductive surface 4a is fixedly connected to this casing and is flush with its inner surface, in such a manner that the clearance D between the conductive surface 4a and the tip 74 of a rotor blade 73 is identical to the clearance between the casing 72 and this blade tip.

The flat conductive surface 4a thus forms a capacitor with the tip of a rotor blade as this tip 74 passes in close proximity to said surface, the capacitance of this capacitor being an inverse function of the clearance D. Moreover, referring now to FIG. 3B, which shows a projection of the blade 73 on the conductive surface 4a, the variable capacitance is proportional to area A of overlap of the flat conductive surface 4a of the electrode with the projected surface 7 of the blade 73.

By connecting the other end of the conductor 21 of the coaxial cable 20 to a circuit 70 similar to one of the circuits known from the Patent Specification GB 2 071 852, or any other equivalent oscillator circuit, this circuit can produce an output signal S which is a function of the capacitance of the capacitor formed by the tip of the blade 74 and the conductive surface 4a. This signal S can be processed electronically in known manner in order to determine the clearance D or the speed of rotation of the turbine rotor.

Thus, by means of the device in accordance with the invention it is possible to determine at the same time, for the same point of the casing, the blade tip clearance and the rotor speed, which are decisive parameters for correctly controlling the engine.

In the case that, in addition to the capacitance-measurement central conductor 21, the capacitive sensor comprises two other conductors 22, 23 which are exposed at the side of the probe 1, the three conductors are arranged as a capacitive bridge with the other end of the coaxial cable grounded, which makes it possible to eliminate any variations in characteristics which can disturb the capacitance measurement. This elimination is possible owing to the special structure of the sensor itself and not merely by external means.

We claim:

1. A capacitive sensor device for use at least up to 1300° C. and 40 bar, including a coaxial cable comprising
   a conductive sleeve (10);
   at least one inner conductor (21);
   an insulator (19) separating the conductive sleeve and the inner conductor; and
   an end portion (1) of larger diameter than the rest of the cable and forming a probe, the probe including
     a probe insulator made of an anticorrosive refractory element (9, 29); and
     a first and a second anticorrosive refractory metal protection element (5, 4), welded to the sleeve and to said inner conductor, respectively, for locking the probe insulator, which second protection element acts as an electrode (4) having a flat surface (4a) of an area larger than the cross-sectional area of an end portion of the inner conductor.

2. The device of claim 1, wherein
   an end portion of the sleeve has a sleeve diameter that is larger than other portions of the sleeve, the end portion of the conductor being bare and electrically coupled with the second protection element;
   the end portion of the inner conductor has a conductor diameter that is larger than other portions of the conductor;
   the probe insulator comprises:
     a refractory ring, for insulating the electrode; and
     a filler material connecting the ring to the insulator and for insulating part of the inner conductor; and
   the probe portion is formed into an integrated whole including all of the above.

3. A device as claimed in claim 2, in which
   the electrode (4) is a cylinder of which
     a base which faces the exterior of the probe forms said flat surface (4a) and
     the other base includes an axial recess (17) for receiving the bare end (21a) of the inner conductor (21),
   the inner conductor is secured in said recess by means of a weld (11b) formed when the end of the inner conductor and the electrode (4) are in position in the probe, protected against corrosion.

4. A device as claimed in claim 3, in which
   the conductive sleeve and inner conductor are made of Inconel,
   the insulator is of compacted magnesium oxide powder,
   the electrode (4) and the first protection element (5) are made of platinum or of MA956,
   the refractory ring (9) is made of aluminum or of beryllium oxide, and
   the filler material (29) is a non-organic cement on a ceramic basis.

5. A device as claimed in claim 2, in which the coaxial cable (20) comprises a first inner conductor, referred to as the central conductor (21), connected to said electrode (4) and disposed centrally in the sleeve, and two further inner conductors (22, 23) whose ends (22a, 23a) at the probe side are cut in such a manner that they terminate in said filler material (29), and whose other ends are arranged as a capacitance bridge with the central conductor (21) and ground.

6. A device as claimed in claim 1, in which the welds (11a, 11b) are laser welds.

7. A device as claimed in claim 1, in which the flat electrode surface (4a) of the probe (1) forms a first electrode of a capacitor whose second electrode is formed by a parallel metal surface situated at a variable distance from this flat electrode surface of the probe, the coaxial cable (20) connecting said probe (1) to means (70) for the measurement of capacitance variations of the capacitor thus formed.

8. A device as claimed in claim 7, for mounting on the casing of a combustion chamber of a turbo engine, in a range of temperatures up to 1300° C. and pressures up to 40 bar, whose flat electrode surface (4a) is arranged to coincide with the inner wall of the casing, for measuring the capacitance of the capacitor having a first electrode formed by said flat electrode surface (4a) and a second electrode formed, successively, by the tips of the rotor blades in the casing of the turbo engine.

9. A method of realizing a capacitive sensor device usable at least up to 1300° C. and 40 bar, comprising the steps of:

forming a coaxial cable (20) having a cylindrical metal sleeve (10) separated from an inner conductor (21) by an insulator (19), and forming an end portion (1) of a diameter larger than the rest of the cable to form a probe in which a probe insulator is a refractory element (9, 29), the probe insulator being locked by a first and a second anticorrosive refractory metal protection element (5, 4), which first and second protection elements are welded (11a, 11b) to the sleeve and to said inner conductor, respectively, which second protection element forms an electrode (4) having a flat surface (4a) of an area larger than the cross-sectional area of the end portion of the inner conductor.

10. A method as claimed in claim 9, which for forming said end portion (1) comprises the steps of:

removing the insulator (19) between the end portion of the sleeve (10a) and the end portion (21a) of the inner conductor of said end portion of the cable (1);

securing the electrode (4) to the end portion (21a) of the inner conductor by means of a laser weld (11b) formed when the end of the inner conductor is in position in a recess (17) of said electrode (4) and in the end portion of the sleeve (1), protected against corrosion;

fitting a refractory ring (9) between the electrode and the end portion of the sleeve and securing the first protection element in the form of a ring (5) onto the end of the sleeve (10a) by means of a laser weld (11a);

injecting a refractory filler material (29) into a hollow portion of the sleeve between the refractory ring (9) and the insulator (19) of the cable through apertures (10c) formed in said end portion of the sleeve (10a).

* * * * *